(12) United States Patent
Ohlsson et al.

(10) Patent No.: US 12,041,497 B2
(45) Date of Patent: Jul. 16, 2024

(54) OPTIONAL SENDING OF COMPLETE MESSAGE IN CONDITIONAL HANDOVER

(71) Applicant: Telefonaktiebolaget LM Ericsson (publ), Stockholm (SE)

(72) Inventors: Oscar Ohlsson, Bromma (SE); Cecilia Eklöf, Täby (SE); Mattias Bergström, Sollentuna (SE); Walter Müller, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 477 days.

(21) Appl. No.: 17/598,604

(22) PCT Filed: Mar. 25, 2020

(86) PCT No.: PCT/EP2020/058351
§ 371 (c)(1),
(2) Date: Sep. 27, 2021

(87) PCT Pub. No.: WO2020/193626
PCT Pub. Date: Oct. 1, 2020

(65) Prior Publication Data
US 2022/0191755 A1 Jun. 16, 2022

Related U.S. Application Data

(60) Provisional application No. 62/825,118, filed on Mar. 28, 2019.

(51) Int. Cl.
*H04W 36/00* (2009.01)
*H04L 1/1812* (2023.01)
(Continued)

(52) U.S. Cl.
CPC ..... *H04W 36/00837* (2018.08); *H04L 1/1812* (2013.01); *H04W 36/00835* (2018.08);
(Continued)

(58) Field of Classification Search
CPC ..... H04W 36/00837; H04W 36/00835; H04W 36/36; H04W 74/0833; H04W 36/0005; H04W 76/19; H04W 36/30; H04L 1/1812
See application file for complete search history.

(56) References Cited

U.S. PATENT DOCUMENTS

2016/0050690 A1 2/2016 Yun et al.
2017/0055187 A1 2/2017 Kang et al.
(Continued)

FOREIGN PATENT DOCUMENTS

CN 103718604 A 4/2014
CN 105580427 A 5/2016
(Continued)

OTHER PUBLICATIONS

3GPP, "3rd Generation Partnership Project; Technical Specification Group Radio Access Network; NR; Radio Resource Control (RRC) protocol specification (Release 15)", 3GPP TS 38.331 V15.4.0, Dec. 2018, pp. 11-474.
(Continued)

*Primary Examiner* — Vinncelas Louis
(74) *Attorney, Agent, or Firm* — Murphy, Bilak & Homiller, PLLC

(57) ABSTRACT

The invention refers to a method, in a wireless device operating in a wireless communication network, the method comprising: receiving, from a source node, a conditional handover command, the conditional handover command including or being associated with a triggering condition for execution of handover to a target cell or target beam; detecting, that the triggering condition is met; if a conditional handover configuration is not yet completed, executing the handover to the target cell or beam without sending a message confirming completion of a conditional handover configuration to the source node, and otherwise sending the message confirming completion of the conditional handover
(Continued)

configuration to the source node; the invention further relates to a corresponding wireless device.

19 Claims, 11 Drawing Sheets

(51) Int. Cl.
  *H04W 36/36* (2009.01)
  *H04W 74/0833* (2024.01)
(52) U.S. Cl.
  CPC ....... *H04W 36/36* (2013.01); *H04W 74/0833* (2013.01); *H04W 36/0005* (2013.01)

(56) References Cited

U.S. PATENT DOCUMENTS

| | | | |
|---|---|---|---|
| 2021/0051537 A1* | 2/2021 | Zhang | H04W 36/36 |
| 2021/0235341 A1* | 7/2021 | Decarreau | H04W 36/30 |
| 2022/0150780 A1* | 5/2022 | Chen | H04W 76/19 |

FOREIGN PATENT DOCUMENTS

| | | |
|---|---|---|
| EP | 3949514 A1 | 2/2022 |
| WO | 2013024574 A1 | 2/2013 |
| WO | 2018104217 A1 | 6/2018 |
| WO | 2019215666 A1 | 11/2019 |
| WO | 2020193626 A1 | 10/2020 |

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.4.0, Dec. 2018, pp. 1-933.

Catt, et al., "RRC Reconfiguration Complete Indication to DU", 3GPP TSG-RAN WG3—#99, R3-180834, Athens, Greece, Feb. 25-Mar. 1, 2019, pp. 1-3.

Catt, "Signalling Procedure of Conditional Handover", 3GPP TSG-RAN WG2 Meeting #105, R2-1900949, Athens, Greece, Feb. 25-Mar. 1, 2019, pp. 1-3.

* cited by examiner

OPTIONAL SENDING OF COMPLETE MESSAGE IN CONDITIONAL HANDOVER

TECHNICAL FIELD

The present disclosure generally relates to the field of wireless network communications, and more particularly, to executing handover without sending a message confirming completion of conditional handover configuration.

BACKGROUND

Handovers in Long Term Evolution (LTE) and New Radio (NR) are normally triggered when a User Equipment (UE) experiences poor radio conditions. If the radio conditions for the UE deteriorate rapidly, the conditions may become so poor that the actual handover procedure may be hard to execute. For instance, if uplink radio conditions become too poor, it may be that the network is unable to detect the measurement report transmitted by the UE and hence cannot initiate the handover procedure. Poor radio conditions in the downlink may result in the UE being unable to successfully receive a handover command (i.e., the radio resource control (RRC) connection reconfiguration message) sent by the network. In poor radio conditions, the downlink message may be segmented, i.e., sent in several pieces, which increases the risk of retransmissions—this produces an increased risk that the message does not reach the UE in time. Failed transmission of a handover command is a common reason for unsuccessful handovers.

To improve mobility robustness and address the issues above, a concept known as conditional handover is currently being studied by the 3rd-Generation Partnership Project (3GPP), for both LTE and NR. To avoid the undesired dependence on the serving radio link upon the time (and radio conditions) where the UE should execute the handover, it should be possible to provide RRC signaling for the handover to the UE earlier. To achieve this, the HO command may be associated with a condition, based, for example, on radio conditions similar to those associated with an A3 event, where a given neighbor becomes X dB better than the target cell. As soon as the condition is fulfilled, the UE executes the handover in accordance with the provided handover command (or conditional handover command). The conditional handover (CHO) command may, for example, come in the form of a ConditionalRRCReconfiguration or ConditionalRRCConnection Reconfiguration.

Such a condition could, for example, be that the quality of the target cell or beam becomes X dB stronger than the serving cell. The threshold Y used in a preceding measurement reporting event should then be chosen lower than the one in the handover execution condition. This allows the serving cell to prepare the handover upon reception of an early measurement report and to provide the RRCConnectionReconfiguration with mobilityControlInfo (LTE) or RRCReconfiguration with a reconfigurationWithSync (NR) at a time when the radio link between the source cell and the UE is still stable. The execution of the handover is done at a later point in time (and threshold) that is considered optimal for the handover execution.

A key idea in conditional handover is that transmission and execution of the handover command are separated. This allows a handover command to be sent earlier to the UE when the radio conditions are still good, thus increasing the likelihood that the message is successfully transferred. The execution of the handover command is done at later point in time based on an associated triggering condition or threshold, such as mentioned above.

The threshold used in a preceding measurement reporting event should be lower than the one in the handover execution condition (assuming the threshold is in terms of a target cell being better than the serving cell by X dB). Put more generally, the threshold for triggering measurements, which may in turn trigger the sending of a handover command, should correspond to relatively better radio conditions for the currently serving cell or beam, compared to the conditions that trigger the execution of the handover by the UE. This allows the serving cell to prepare the handover upon reception of an early measurement report and provide the handover command while the radio link to the UE is still stable. The execution of the handover is done at a later point in time (and threshold) that is considered optimal for the handover execution.

FIG. 1 shows the signaling flow for a conditional handover. To configure a candidate target cell, the source node sends a conditional handover command to the UE that contains the handover command and the associated triggering conditions. The conditional handover command (i.e., the Radio Resource Control (RRC) connection reconfiguration message) consists of two parts: configuration information for the target cell generated or provided by the target node during the handover preparation phase and the triggering condition generated by the source node. Later on, if the triggering condition is met, the UE executes the handover by performing random access and sending the handover complete message (i.e., the RRC connection reconfiguration complete message) to the target cell.

The source node may be configured for conditional handover for multiple candidate target cells. This can be accomplished in different ways. One way is for the network to send a single conditional handover command (or similarly named) that contains the handover command (configuration information) and associated triggering condition for each of the candidate target cells. Another way is for the network to send multiple conditional handover commands, each containing a handover command (configuration information) and associated triggering condition for one target candidate cell.

The sending of a "complete" message from the UE to the source node to confirm that the conditional handover configuration procedure has been successfully completed serves an important purpose, namely to confirm that the UE has successfully received the conditional handover command, completed the procedure, and thus that the candidate target cells have been added by the UE. In this way, the source node knows when the UE is ready and when a subsequent procedure can be started.

However, the sending of a "complete" message, confirming that the conditional handover configuration procedure has been successfully completed, risks delaying a handover, since the complete message must be sent to the source node before the handover is executed. This occurs when the triggering condition for a candidate target cell is met while the conditional handover configuration is still ongoing. The delayed handover might in turn result in service interruption and, in the worst case, radio link failure and RRC re-establishment.

SUMMARY

It is an object of the present invention to provide an improved handling of a conditional handover procedure.

This object is achieved by the independent claims. Advantageous embodiments are described in the dependent claims and by the following description.

According to some of the techniques described herein, to ensure that a handover is executed as fast as possible, the UE is allowed to skip the message confirming completion of conditional handover configuration if the triggering condition is met for a candidate target cell before the conditional handover configuration procedure has completed. If the handover is not executed immediately, the UE can send the complete message as a response to the conditional handover command to confirm that conditional handover has been successfully configured.

Embodiments of the invention improve the performance and reliability of conditional handover by allowing the handover to be executed without first transmitting the complete message in the source cell. This provides for faster execution of the handover, which reduces service interruption and decreases the risk of radio link failure in the source cell. The embodiments also allow the UE to send a message confirming successful configuration of conditional handover if the handover is not executed immediately.

According to some embodiments, a method, in a wireless device operating in a wireless communication network, includes receiving, from a source node, a conditional handover command, the conditional handover command including or being associated with a triggering condition for execution of handover to a target cell or target beam. The method includes, prior to sending a message confirming completion of conditional handover configuration triggered by receipt of the conditional handover command, determining that handover has been triggered. The method further includes, responsive to the determining, executing handover without sending the message confirming completion of conditional handover configuration.

According to some embodiments, a method, in a wireless device operating in a wireless communication network, includes receiving, from a source node, a conditional handover command, the conditional handover command including or being associated with a triggering condition for execution of handover to a target cell or target beam. The method also includes conditionally sending a message confirming completion of conditional handover configuration in response to the conditional handover command. Conditionally sending the message comprises (a) sending the message if no handover is triggered prior to a time for sending the message and (b) refraining from sending the message and executing handover if handover is triggered prior to the time for sending the message.

Further aspects of the present invention are directed to an apparatus, network node, base station, wireless device, UE, network devices, computer program products or computer readable storage medium corresponding to the methods summarized above and functional implementations of the above-summarized network node and wireless device.

DETAILED DESCRIPTION

Figure 1:
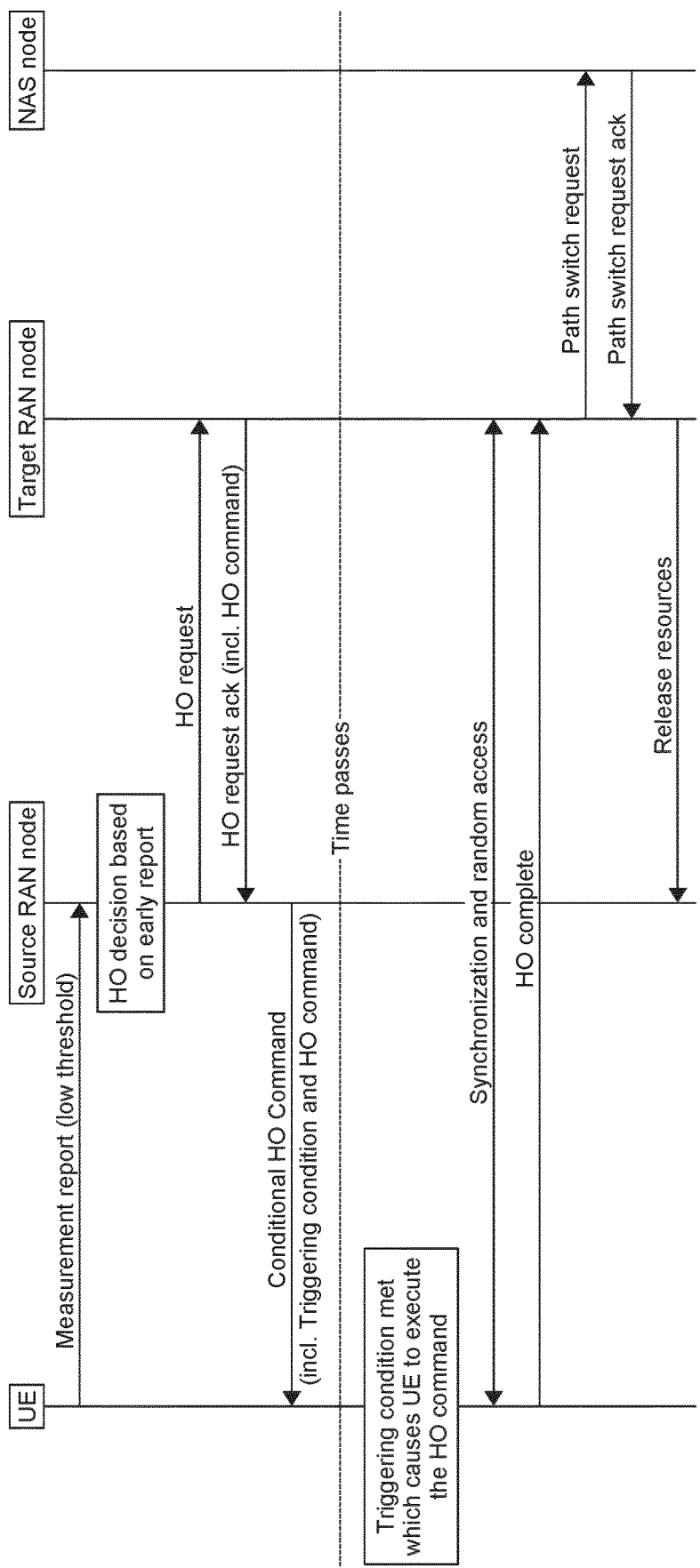
FIG. 1 illustrates a signaling flow for a conditional handover.

Exemplary embodiments of the present disclosure will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment can be tacitly assumed to be present/used in another embodiment. Any two or more embodiments described in this document may be combined with each other. The embodiments are described with respect to LTE, including LTE-M, but can be adapted in other radio access technologies (RATs) where the techniques or selections may be relevant.

Embodiments described herein enable the sending of conditional handover complete message to be optional. To ensure that a handover is executed as fast as possible, the UE is allowed to skip the conditional handover complete message if the triggering condition is met for a candidate target cell before the conditional handover configuration procedure has completed. If the handover is not executed immediately upon conditional handover configuration, the UE can send a conditional handover complete message to finalize the conditional handover configuration procedure.

The description in this section applies to both LTE and NR and uses generic names for the nodes and messages. In the case of LTE, the nodes and messages in the description are mapped as follows: radio access network (RAN) node↔eNB; non-access stratum (NAS) node↔mobility management entity (MME); Handover command↔RRCConnectionReconfiguration message including MobilityControlInfo; and Handover complete↔RRCConnectionReconfigurationComplete. In case of the NR, the following mapping is used: RAN node↔gNB; NAS node↔access and mobility function (AMF); Handover command↔RRCReconfiguration message including reconfigurationWithSync; and Handover complete↔RRCReconfigurationComplete.

Note also that the terminology "cell," as in "serving cell," "source cell," "target cell," etc., is used in the present description to describe the conditional handover techniques. It should be appreciated that these techniques are applicable to systems or scenarios where the concept of a "beam" replaces or supplements that of a "cell." Thus, the techniques described herein are applicable for conditional handovers from a source cell or beam to a target cell or beam.

Likewise, the techniques described herein may also refer to a "source node" and a "target node." These refer to the nodes providing the source and target cells or beams, respectively. However, these need not be different physical nodes. Thus, the techniques described herein may be applicable without regard to whether the source cell or beam is provided by a different node than the target cell or beam.

Figure 2:
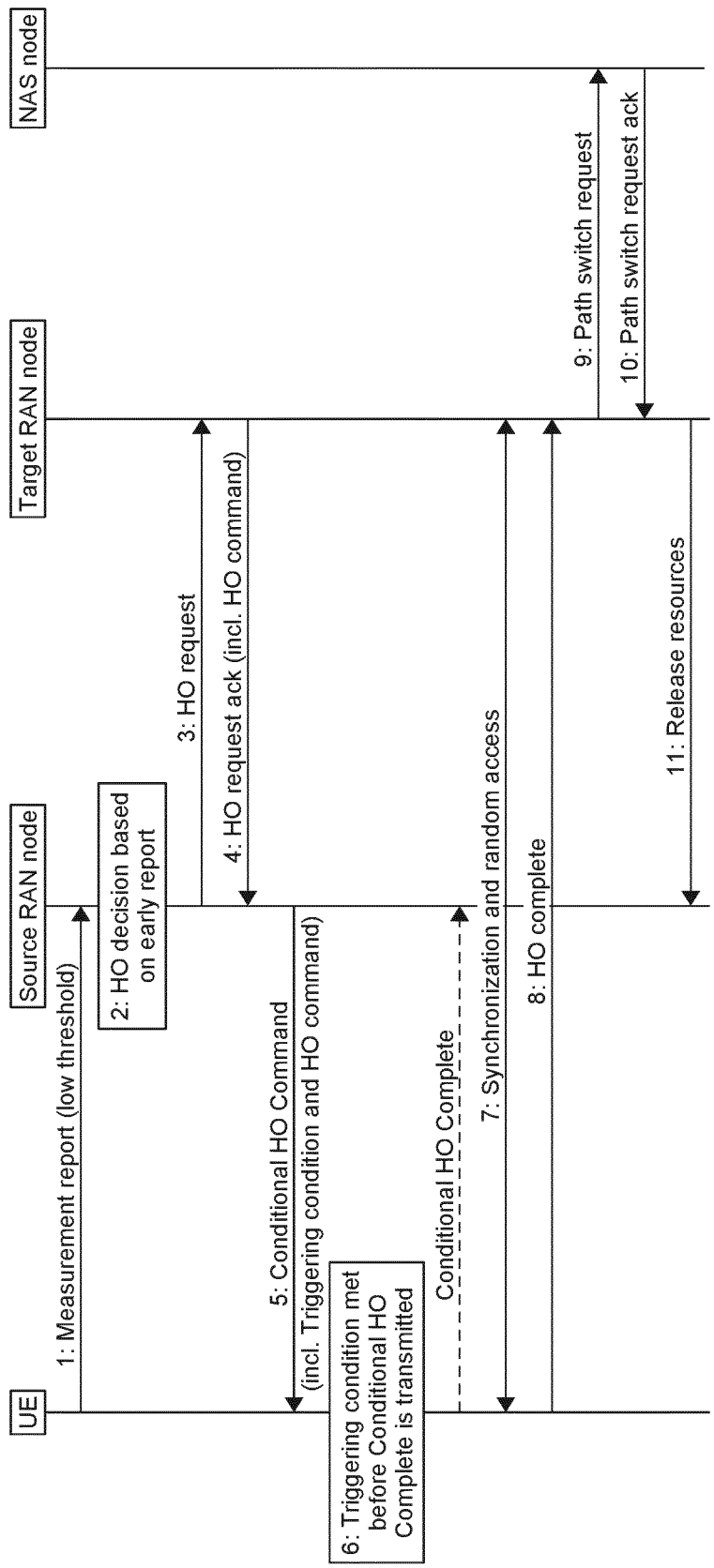
FIG. 2 illustrates an optimized conditional handover, where the UE is allowed to skip the conditional handover complete message, according to some embodiments.

FIG. 2 shows an optimized conditional handover (in the case of a single target cell) where the UE is allowed to skip the conditional handover complete message, according to some embodiments. At Step 1, a measurement report is triggered when the low threshold is met. Based on the early measurement report, the source node decides to trigger a conditional handover (Step 2). The source node sends a conditional HO request to the target node which includes the UE's current configuration (Step 3). The target node responds with an HO request acknowledgement, which includes the HO command to be applied by the UE (Step 4). The HO command contains a delta configuration that the target node calculated based on the UE's current configuration, or a full configuration. In the discussion herein, this configuration specified by the target node, whether a full configuration or a delta configuration, is referred to as simply "configuration information" or "handover configuration information." In FIG. 2, this configuration information is identified in Step 5 as the "HO command" included in the conditional HO command.

At Step 5, the source node sends the conditional handover command to the UE, which contains the handover command prepared by the target RAN node and the triggering condition. At Step 6, the UE adds the target candidate cell and starts monitoring the triggering condition received in the conditional handover command. However, before the UE has sent the conditional handover complete message, the triggering condition for the candidate target cell is met. The UE skips the transmission of the conditional handover complete message and instead directly executes the handover by applying the configuration in the handover command. Alternatively, the handover does not occur immediately, and the UE then sends a conditional handover complete message.

The UE synchronizes and performs random access to the target cell (Step 7). The UE sends a handover complete to the target node to indicate that the handover has been successfully completed (Step 8). The target node triggers the path switch procedure to request the CN to change UP path from the source to target node (Step 9) and the path switch is performed (Step 10). The target node indicates to the source node to release its resources for the UE (Step 11).

If the complete message is skipped, the source node will later detect this when the target node notifies the source node of the handover. This is either done via the release resources message in Step 11 or it can be done using a new handover completed indication sent from target to source, e.g., after Step 8.

Although the description above assumes a single candidate target cell is configured in the conditional handover configuration procedure, the solution also works for multiple candidate target cells. In the case of multiple target cells, there will be multiple triggering conditions (one for each candidate target) and any of them may trigger the handover to be executed early and cause the UE to skip the complete message. In the case where the candidate target cells are added using separate conditional handover procedures, the complete message may also be skipped if a handover is triggered to target cell added in an earlier conditional handover procedure.

In addition to skipping the conditional handover complete message, the UE may also be allowed to skip the HARQ/RLC ACK for the conditional handover command when a handover is executed. It is also possible to generalize the above behavior and allow the UE to skip the rest of any ongoing procedure in the source cell when a handover is executed.

In some embodiments, the source node may indicate to the UE in the conditional handover command whether the complete message is allowed to be skipped or not. The idea of skipping the complete message can also be used in a conditional resume. The basic idea in conditional resume is that the UE resumes or re-establishes RRC connection in the target cell when the triggering condition is met instead of executing a handover.

From a UE point of view, the following steps may be performed:

The UE receives from the source node the conditional handover command (prepared by the target node) and a triggering condition, The UE adds the (candidate) target cell/beam (provided by the target node) and starts monitoring the triggering condition received together with the conditional handover command, If the triggering condition for the target cell is met before completion of the conditional handover configuration, the UE skips the transmission of the conditional handover complete message and immediately executes the handover by applying the configuration in the conditional handover command, Otherwise, if the triggering condition for the target cell is not met before completion of the conditional handover configuration, the UE will send a conditional handover complete message to the source node at completion of the configuration (in which case the handover does not occur immediately).

After that the following steps may be performed:

The UE synchronizes and performs random access to the target cell.

The UE sends a handover complete to the target node to indicate that the handover has been successfully completed.

From the source node point of view, the following steps may be performed:

The source node sends a conditional handover, HO, request to the target node which may include the UE's current configuration.

The source node receives from the target node a HO request acknowledge message which includes the HO command to be applied by the UE. The HO command may contain a delta configuration which the target node calculated based on the UE's current configuration or may contain a full configuration.

The source node sends the conditional HO command to the UE which contains the HO command prepared by the target RAN node and the triggering condition.

Releasing the resources for the UE after receiving an information about successful completion of the HO. In case of an immediate completion of the conditional handover configuration (i.e. if the triggering condition for the target cell is met before completion of the conditional handover configuration) the source node may get the information from the target node (release resource message or a HO complete message). Otherwise, the source node may get the information from the UE (conditional handover complete message).

Figure 3:
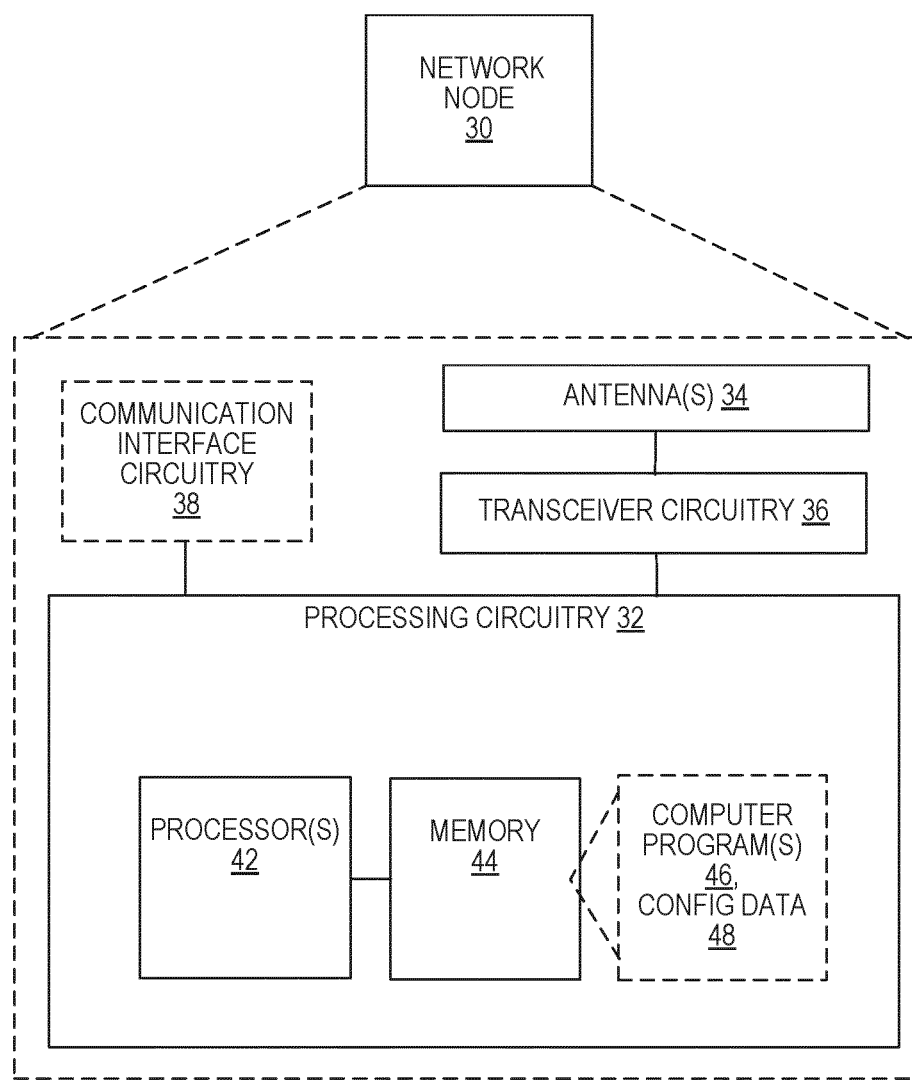
FIG. 3 is a block diagram of a network node, according to some embodiments.

FIG. 3 shows an example network node 30 that may be configured to help a wireless device or UE carry out one or more of these disclosed techniques. Network node 30 may be an evolved Node B (eNodeB), Node B or gNB. While a network node 30 is shown in FIG. 3, the operations can be performed by other kinds of network access nodes, including a radio network node such as base station, radio base station, base transceiver station, base station controller, network controller, NR BS, Multi-cell/multicast Coordination Entity (MCE), relay node, access point, radio access point, Remote Radio Unit (RRU) Remote Radio Head (RRH), or a multi-standard BS (MSR BS).

In the non-limiting embodiments described below, network node 30 will be described as being configured to operate as a cellular network access node in an LTE network or NR network. In some embodiments, the technique can be implemented in the RRC layer. The RRC layer could be implemented by one or more network nodes in a cloud environment and hence some embodiments can be implemented in a cloud environment.

Those skilled in the art will readily appreciate how each type of node may be adapted to carry out one or more of the methods and signaling processes described herein, e.g., through the modification of and/or addition of appropriate program instructions for execution by processing circuits 32.

Network node 30 facilitates communication between wireless terminals (e.g., UEs), other network access nodes and/or the core network. Network node 30 may include communication interface circuitry 38 that includes circuitry for communicating with other nodes in the core network, radio nodes, and/or other types of nodes in the network for the purposes of providing data and/or cellular communication services. Network node 30 communicates with wireless devices using antennas 34 and transceiver circuitry 36. Transceiver circuitry 36 may include transmitter circuits, receiver circuits, and associated control circuits that are collectively configured to transmit and receive signals according to a radio access technology, for the purposes of providing cellular communication services.

Network node 30 also includes one or more processing circuits 32 that are operatively associated with the transceiver circuitry 36 and, in some cases, the communication interface circuitry 38. Processing circuitry 32 comprises one or more digital processors 42, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, processing circuitry 32 may comprise fixed circuitry, or programmable circuitry that is specially configured via the execution of program instructions implementing the functionality taught herein, or some mix of fixed and programmed circuitry. Processor 42 may be multi-core, i.e., having two or more processor cores utilized for enhanced performance, reduced power consumption, and more efficient simultaneous processing of multiple tasks.

Processing circuitry 32 also includes a memory 44. Memory 44, in some embodiments, stores one or more computer programs 46 and, optionally, configuration data 48. Memory 44 provides non-transitory storage for the computer program 46 and it may comprise one or more types of computer-readable media, such as disk storage, solid-state memory storage, or any mix thereof. Here, "non-transitory" means permanent, semi-permanent, or at least temporarily persistent storage and encompasses both long-term storage in non-volatile memory and storage in working memory, e.g., for program execution. By way of non-limiting example, memory 44 comprises any one or more of SRAM, DRAM, EEPROM, and FLASH memory, which may be in processing circuitry 32 and/or separate from processing circuitry 32. Memory 44 may also store any configuration data 48 used by the network access node 30. Processing circuitry 32 may be configured, e.g., through the use of appropriate program code stored in memory 44, to carry out one or more of the methods and/or signaling processes detailed hereinafter.

Processing circuitry 32 of network node 30 is configured, according to some embodiments, to act as a source RAN node. In this case, the source RAN node may hand over a wireless device to a target RAN node with or without receiving a conditional handover complete message. Processing circuitry 32 is otherwise configured to support the techniques of the wireless device described herein.

Figure 4:
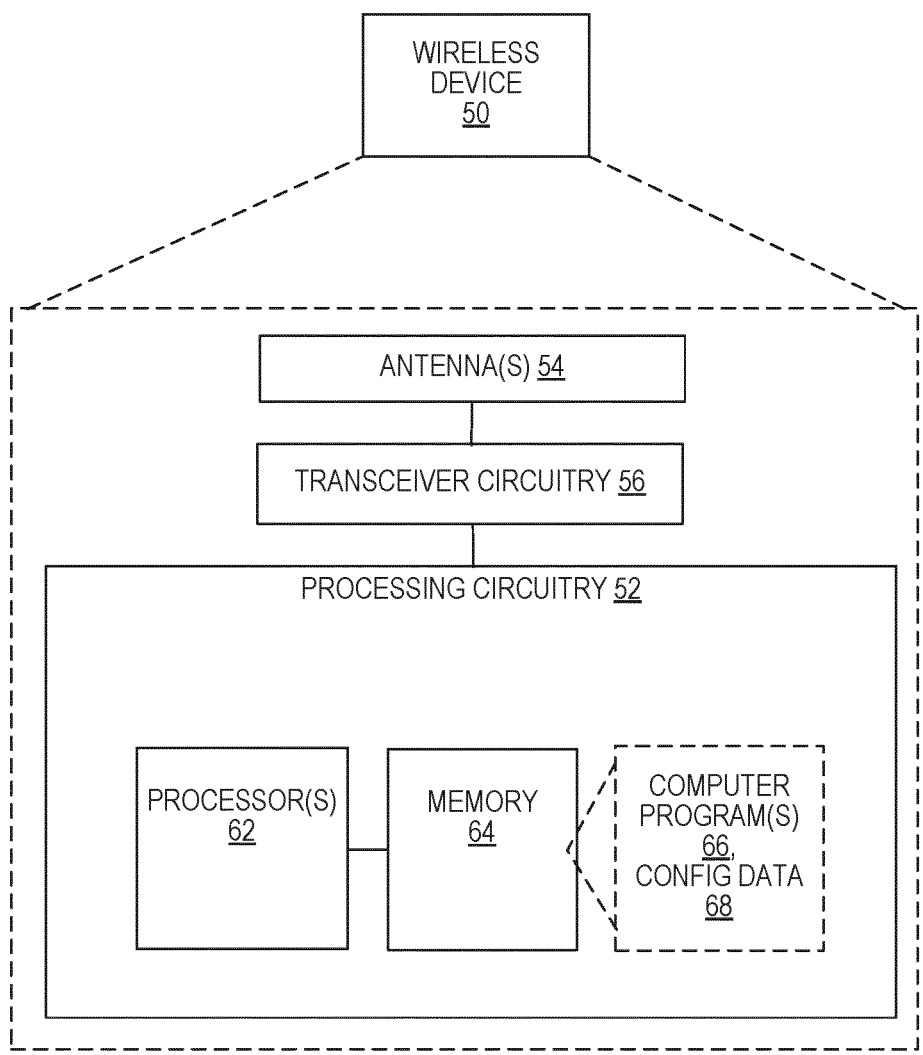
FIG. 4 is a block diagram of a wireless device, according to some embodiments.

FIG. 4 illustrates a diagram of a wireless device 50 configured to carry out the techniques described above for the wireless device 50, according to some embodiments. Wireless device 50 may be considered to represent any wireless devices or terminals that may operate in a network, such as a UE in a cellular network as in the techniques described above. Other examples may include a communication device, target device, MTC device, IoT device, device to device (D2D) UE, machine type UE or UE capable of machine to machine communication (M2M), a sensor equipped with UE, PDA (personal digital assistant), tablet, IPAD tablet, mobile terminal, smart phone, laptop embedded equipped (LEE), laptop mounted equipment (LME), USB dongles, Customer Premises Equipment (CPE), etc.

Wireless device 50 is configured to communicate with a network node or base station in a wide-area cellular network via antennas 54 and transceiver circuitry 56. Transceiver circuitry 56 may include transmitter circuits, receiver circuits, and associated control circuits that are collectively configured to transmit and receive signals according to a radio access technology, for the purposes of using cellular communication services.

Wireless device 50 also includes one or more processing circuits 52 that are operatively associated with the radio transceiver circuitry 56. Processing circuitry 52 comprises one or more digital processing circuits, e.g., one or more microprocessors, microcontrollers, DSPs, FPGAs, CPLDs, ASICs, or any mix thereof. More generally, processing circuitry 52 may comprise fixed circuitry, or programmable circuitry that is specially adapted via the execution of program instructions implementing the functionality taught herein, or may comprise some mix of fixed and programmed circuitry. Processing circuitry 52 may be multi-core.

Processing circuitry 52 also includes a memory 64. Memory 64, in some embodiments, stores one or more computer programs 66 and, optionally, configuration data 68. Memory 64 provides non-transitory storage for computer program 66 and it may comprise one or more types of computer-readable media, such as disk storage, solid-state memory storage, or any mix thereof. By way of non-limiting example, memory 64 comprises any one or more of SRAM, DRAM, EEPROM, and FLASH memory, which may be in processing circuitry 52 and/or separate from processing circuitry 52. Memory 64 may also store any configuration data 68 used by wireless device 50. Processing circuitry 52 may be configured, e.g., through the use of appropriate program code stored in memory 64, to carry out one or more of the methods and/or signaling processes detailed hereinafter.

Processing circuitry 52 of wireless device 50 is configured, according to some embodiments, to execute a handover command without sending a message confirming completion of conditional handover configuration. Processing circuitry 52 is configured to receive, from a source node, a conditional handover command, the conditional handover command including or being associated with a triggering condition for execution of handover to a target cell or target beam. Processing circuitry 52 is also configured to, prior to sending a message confirming completion of conditional handover configuration triggered by receipt of the conditional handover command, determine that handover has been triggered. Processing circuitry 52 is configured to, responsive to the determining, execute handover without sending the message confirming completion of conditional handover configuration.

Figure 5:
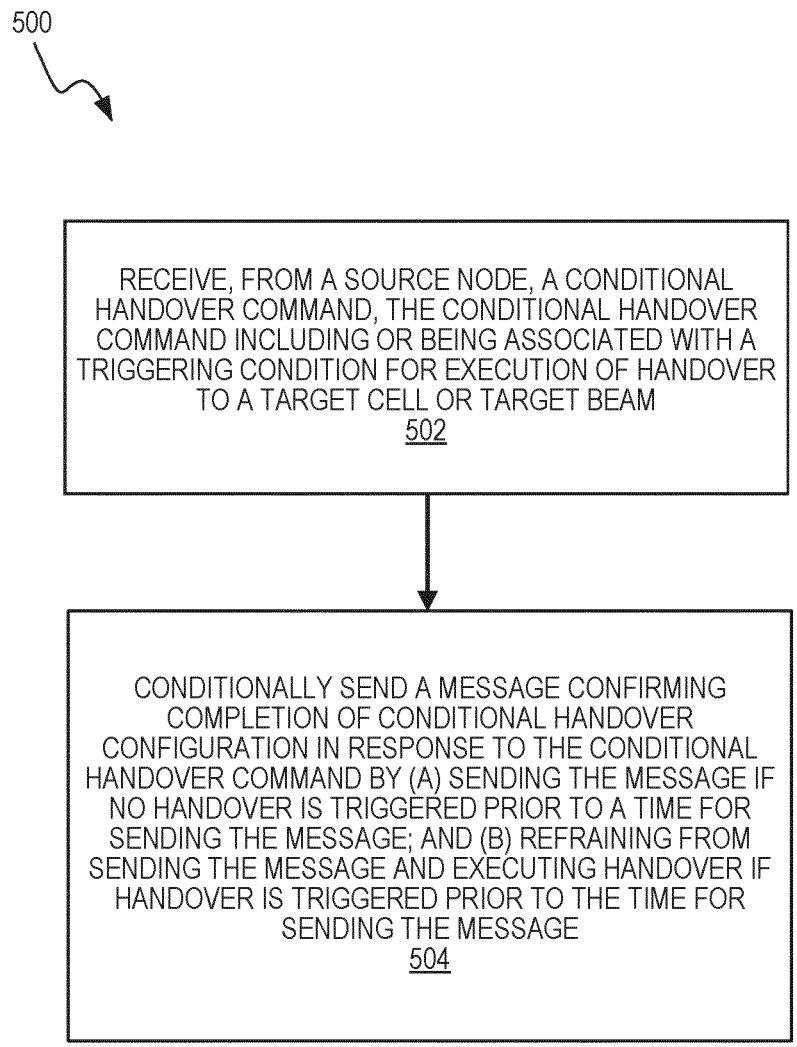
FIG. 5 is a flowchart illustrating a method in the network node, according to some embodiments.

Processing circuitry 52 may also be configured to perform a corresponding method 500, shown in FIG. 5. Method 500 includes receiving, from a source node, a conditional handover command, the conditional handover command including or being associated with a triggering condition for execution of handover to a target cell or target beam (block 502). Method 500 also includes, prior to sending a message confirming completion of conditional handover configuration triggered by receipt of the conditional handover command, determining that handover has been triggered (block 504). Method 500 further includes, responsive to the determining, executing handover without sending the message confirming completion of conditional handover configuration (block 506).

In some embodiments, determining that handover has been triggered includes determining that the triggering condition received in the conditional handover command has been met, and executing handover includes executing handover towards the target cell or target beam. In other embodiments, determining that handover has been triggered includes determining that a triggering condition received in a previously received conditional handover command has been met, and executing handover includes executing handover towards a target cell or target beam corresponding to the previously received conditional handover command.

The determining that handover has been triggered may occur prior to sending a hybrid automatic repeat request (HARQ) acknowledgement in response to the conditional handover command, and the method further include executing the handover without sending the HARQ acknowledgment in response to the conditional handover command.

Executing handover without sending the message confirming completion of conditional handover configuration may be conditioned upon determining that the conditional handover message includes an indication that skipping the message confirming completion of conditional handover condition is allowed. Executing handover may include performing random access towards the wireless communications network and sending a handover complete message towards the wireless communications network after completing the random access.

According to other embodiments, processing circuitry 52 of wireless device 50 is configured to conditionally send a message confirming completion of conditional handover configuration. Processing circuitry 52 is configured to receive, from a source node, a conditional handover command. The conditional handover command includes or is associated with a triggering condition for execution of handover to a target cell or target beam. Processing circuitry 52 is also configured to conditionally send a message confirming completion of conditional handover configuration in response to the conditional handover command. Conditionally sending the message includes sending the message if no handover is triggered prior to a time for sending the message. Processing circuitry 52 may also be configured to refrain from sending the message and executing handover if handover is triggered prior to the time for sending the message.

Figure 6:
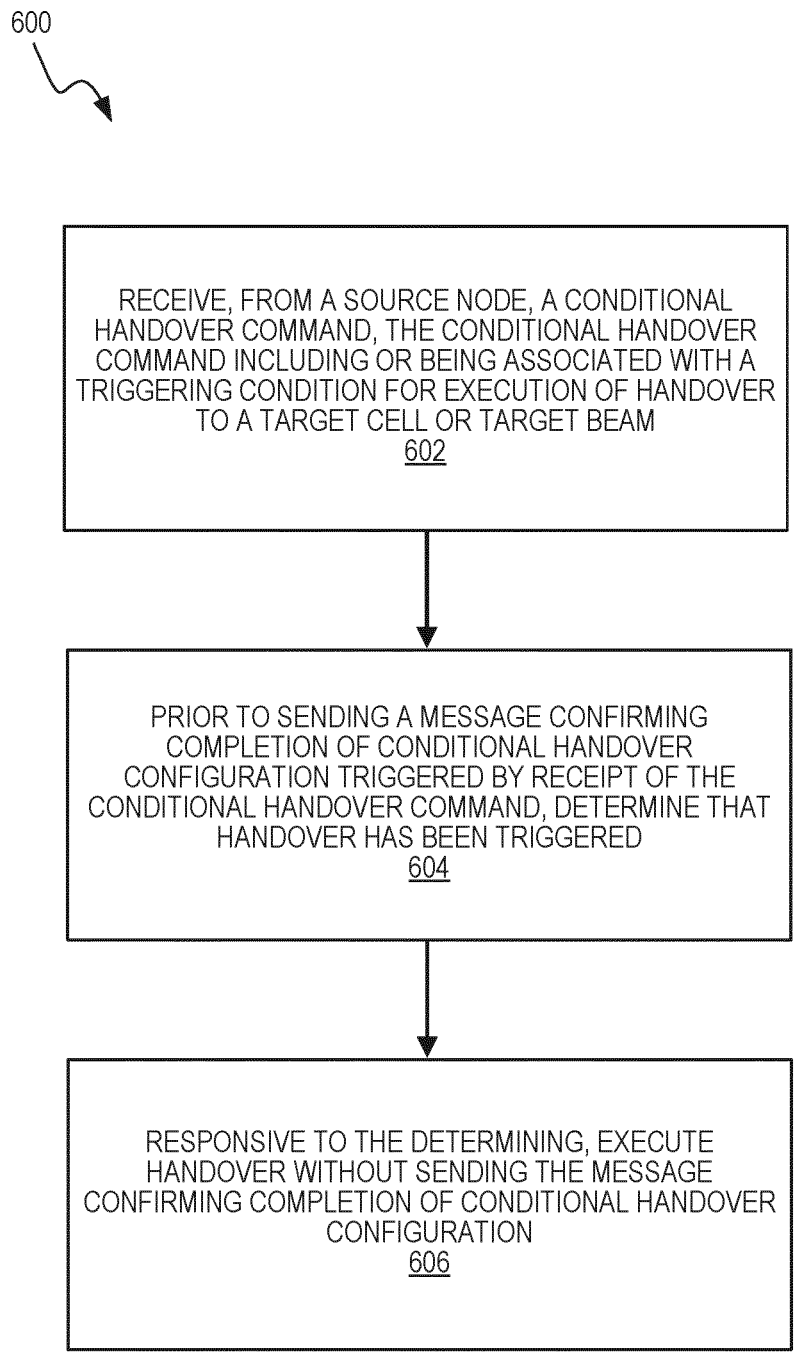
FIG. 6 is a flowchart illustrating another method in the wireless device, according to some embodiments.

Processing circuitry 52 may also be configured to perform a corresponding method 600, shown in FIG. 6. Method 600 includes receiving, from a source node, a conditional handover command (block 602). The conditional handover command includes or being associated with a triggering condition for execution of handover to a target cell or target beam. Method 600 also includes conditionally sending a message confirming completion of conditional handover configuration in response to the conditional handover command, where conditionally sending the message includes sending the message if no handover is triggered prior to a time for sending the message (block 604). This may also include refraining from sending the message and executing handover if handover is triggered prior to the time for sending the message.

Handover may be triggered, prior to the time for sending the message, by fulfillment of the triggering condition received in the conditional handover command, and executing handover may include executing handover towards the target cell or target beam. Handover may also be triggered, prior to the time for sending the message, by fulfillment of a triggering condition received in a previously received conditional handover command, and executing handover may include executing handover towards a target cell or target beam corresponding to the previously received conditional handover command.

Handover may be triggered prior to sending a HARQ acknowledgement in response to the conditional handover command, and the method may further include executing the handover without sending the HARQ acknowledgment in response to the conditional handover command. Handover may be triggered, prior to the time for sending the message, and refraining from sending the message confirming completion of conditional handover configuration is conditioned upon determining that the conditional handover message includes an indication that skipping the message confirming completion of conditional handover condition is allowed.

Executing handover may include performing random access towards the wireless communications network and sending a handover complete message towards the wireless communications network after completing the random access.

Figure 7:
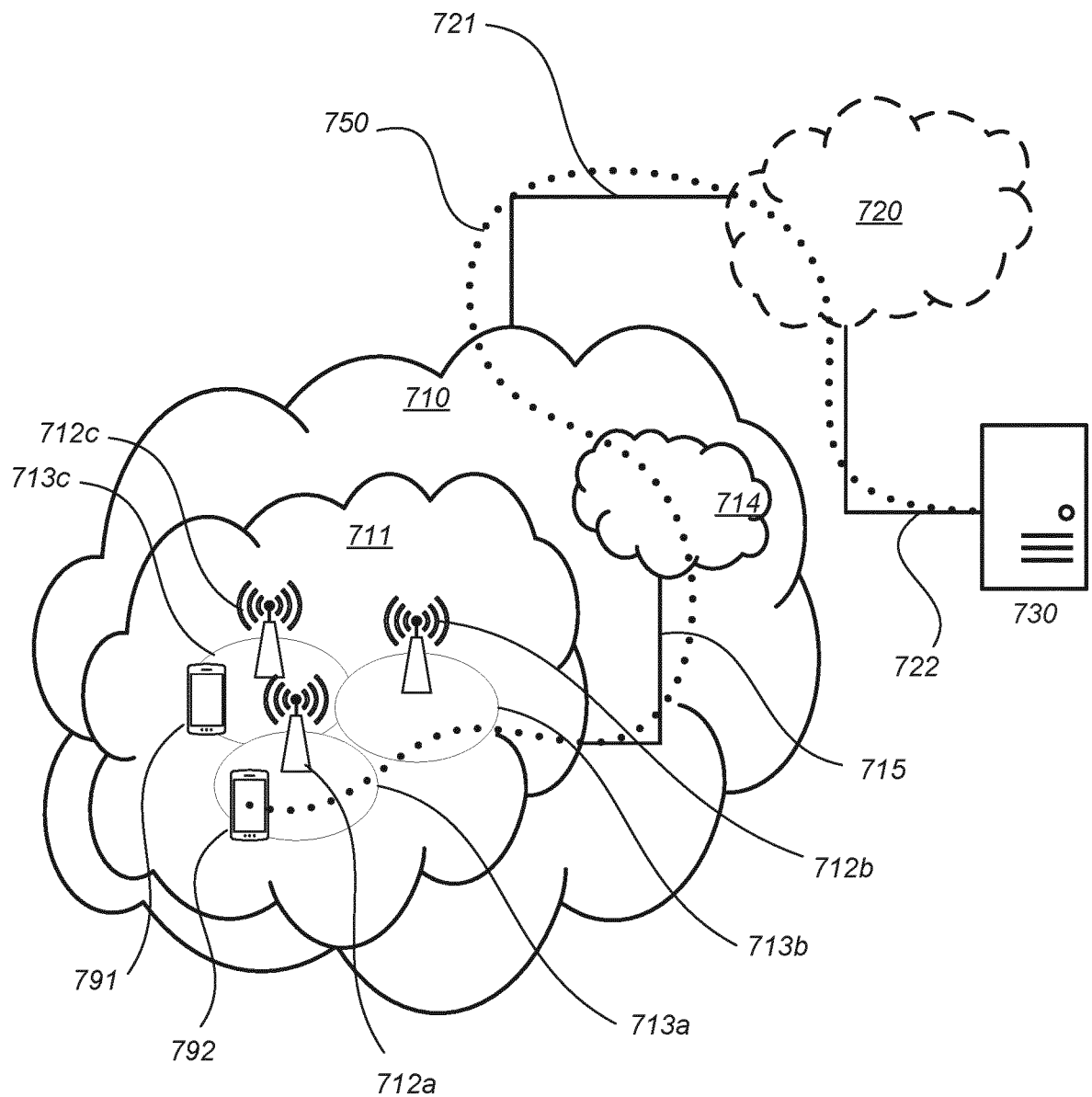
FIG. 7 schematically illustrates a telecommunication network connected via an intermediate network to a host computer, according to some embodiments.

FIG. 7, according to some embodiments, illustrates a communication system that includes a telecommunication network 710, such as a 3GPP-type cellular network, which comprises an access network 711, such as a radio access network, and a core network 714. The access network 711 comprises a plurality of base stations 712a, 712b, 712c, such as NB s, eNBs, gNBs or other types of wireless access points, each defining a corresponding coverage area 713a, 713b, 713c. Each base station 712a, 712b, 712c is connectable to the core network 714 over a wired or wireless connection 715. A first UE 771 located in coverage area 713c is configured to wirelessly connect to, or be paged by, the corresponding base station 712c. A second UE 792 in coverage area 713a is wirelessly connectable to the corresponding base station 712*a*. While a plurality of UEs 791, 792 are illustrated in this example, the disclosed embodiments are equally applicable to a situation where a sole UE is in the coverage area or where a sole UE is connecting to the corresponding base station 712.

The telecommunication network 710 is itself connected to a host computer 730, which may be embodied in the hardware and/or software of a standalone server, a cloud-implemented server, a distributed server or as processing resources in a server farm. The host computer 730 may be under the ownership or control of a service provider, or may be operated by the service provider or on behalf of the service provider. The connections 721, 722 between the telecommunication network 710 and the host computer 730 may extend directly from the core network 714 to the host computer 730 or may go via an optional intermediate network 720. The intermediate network 720 may be one of, or a combination of more than one of, a public, private or hosted network; the intermediate network 720, if any, may be a backbone network or the Internet; in particular, the intermediate network 720 may comprise two or more sub-networks (not shown).

The communication system of FIG. 7 as a whole enables connectivity between one of the connected UEs 791, 792 and the host computer 730. The connectivity may be described as an over-the-top (OTT) connection 750. The host computer 730 and the connected UEs 791, 792 are configured to communicate data and/or signaling via the OTT connection 750, using the access network 711, the core network 714, any intermediate network 720 and possible further infrastructure (not shown) as intermediaries. The OTT connection 750 may be transparent in the sense that the participating communication devices through which the OTT connection 750 passes are unaware of routing of uplink and downlink communications. For example, a base station 712 may not or need not be informed about the past routing of an incoming downlink communication with data originating from a host computer 730 to be forwarded (e.g., handed over) to a connected UE 791. Similarly, the base station 712 need not be aware of the future routing of an outgoing uplink communication originating from the UE 791 towards the host computer 730.

Example implementations, in accordance with an embodiment, of the UE, base station and host computer discussed in the preceding paragraphs will now be described with reference to FIG. 8. In a communication system 800, a host computer 810 comprises hardware 815 including a communication interface 816 configured to set up and maintain a wired or wireless connection with an interface of a different communication device of the communication system 800. The host computer 810 further comprises processing circuitry 818, which may have storage and/or processing capabilities. In particular, the processing circuitry 818 may comprise one or more programmable processors, application-specific integrated circuits, field programmable gate arrays or combinations of these (not shown) adapted to execute instructions. The host computer 810 further comprises software 811, which is stored in or accessible by the host computer 810 and executable by the processing circuitry 818. The software 811 includes a host application 812. The host application 812 may be operable to provide a service to a remote user, such as a UE 830 connecting via an OTT connection 850 terminating at the UE 830 and the host computer 810. In providing the service to the remote user, the host application 812 may provide user data which is transmitted using the OTT connection 850.

The communication system 800 further includes a base station 820 provided in a telecommunication system and comprising hardware 825 enabling it to communicate with the host computer 810 and with the UE 830. The hardware 825 may include a communication interface 826 for setting up and maintaining a wired or wireless connection with an interface of a different communication device of the communication system 800, as well as a radio interface 827 for setting up and maintaining at least a wireless connection 870 with a UE 830 located in a coverage area (not shown in FIG. 8) served by the base station 820. The communication interface 826 may be configured to facilitate a connection 860 to the host computer 810. The connection 860 may be direct or it may pass through a core network (not shown in FIG. 8) of the telecommunication system and/or through one or more intermediate networks outside the telecommunication system. In the embodiment shown, the hardware 825 of the base station 820 further includes processing circuitry 828, which may comprise one or more programmable processors, application-specific integrated circuits, field programmable gate arrays or combinations of these (not shown) adapted to execute instructions. The base station 820 further has software 821 stored internally or accessible via an external connection.

The communication system 800 further includes the UE 830 already referred to. Its hardware 835 may include a radio interface 837 configured to set up and maintain a wireless connection 870 with a base station serving a coverage area in which the UE 830 is currently located. The hardware 835 of the UE 830 further includes processing circuitry 838, which may comprise one or more programmable processors, application-specific integrated circuits, field programmable gate arrays or combinations of these (not shown) adapted to execute instructions. The UE 830 further comprises software 831, which is stored in or accessible by the UE 830 and executable by the processing circuitry 838. The software 831 includes a client application 832. The client application 832 may be operable to provide a service to a human or non-human user via the UE 830, with the support of the host computer 810. In the host computer 810, an executing host application 812 may communicate with the executing client application 832 via the OTT connection 850 terminating at the UE 830 and the host computer 810. In providing the service to the user, the client application 832 may receive request data from the host application 812 and provide user data in response to the request data. The OTT connection 850 may transfer both the request data and the user data. The client application 832 may interact with the user to generate the user data that it provides.

Figure 8:
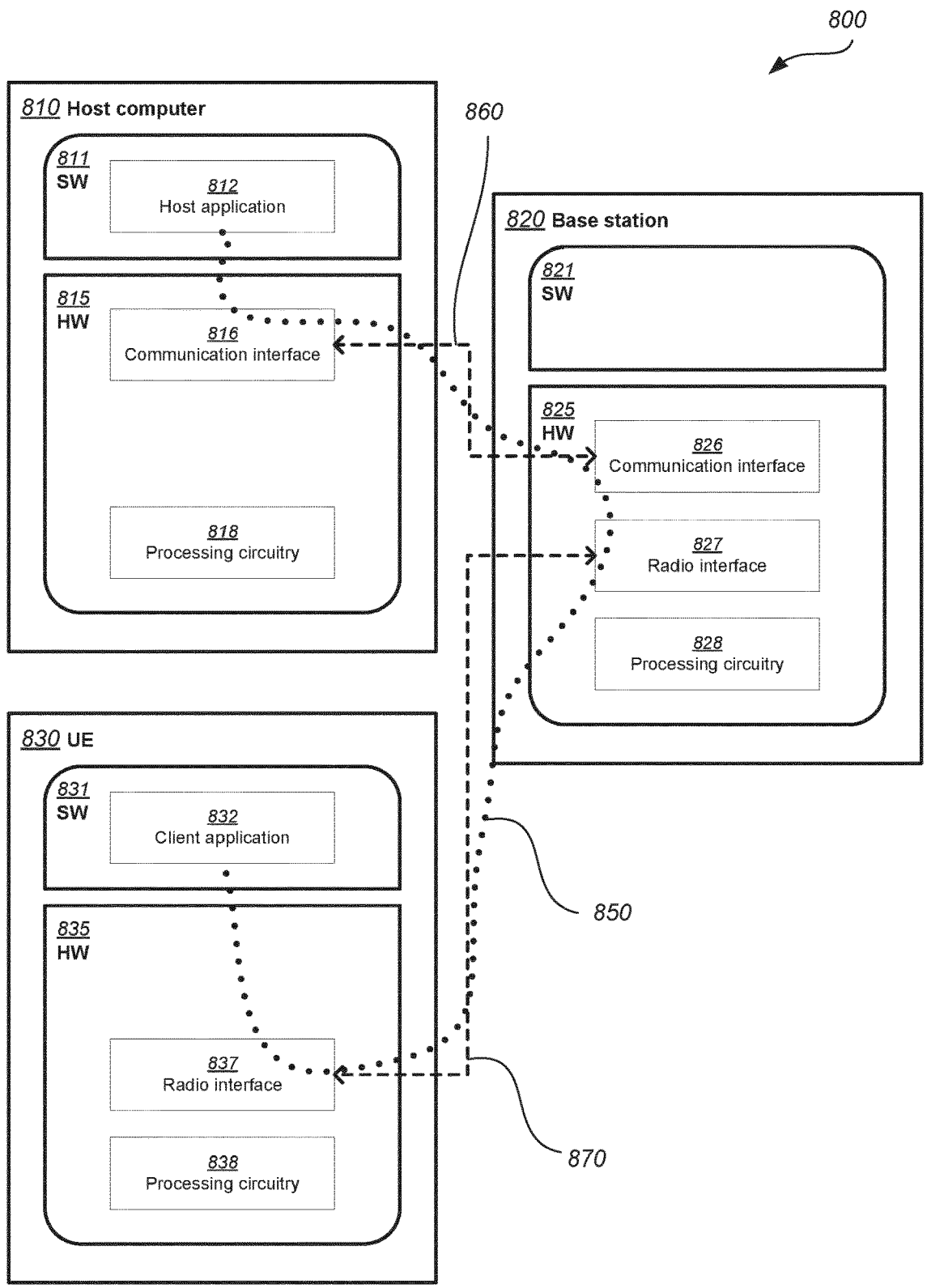
FIG. 8 is a generalized block diagram of a host computer communicating via a base station with a user equipment over a partially wireless connection, according to some embodiments.

It is noted that the host computer 810, base station 820 and UE 830 illustrated in FIG. 8 may be identical to the host computer 730, one of the base stations 712*a*, 712*b*, 712*c* and one of the UEs 791, 792 of FIG. 7, respectively. This is to say, the inner workings of these entities may be as shown in FIG. 8 and independently, the surrounding network topology may be that of FIG. 7.

In FIG. 8, the OTT connection 850 has been drawn abstractly to illustrate the communication between the host computer 810 and the use equipment 830 via the base station 820, without explicit reference to any intermediary devices and the precise routing of messages via these devices. Network infrastructure may determine the routing, which it may be configured to hide from the UE 830 or from the service provider operating the host computer 810, or both. While the OTT connection 850 is active, the network infrastructure may further take decisions by which it dynamically changes the routing (e.g., on the basis of load balancing consideration or reconfiguration of the network).

The wireless connection 870 between the UE 830 and the base station 820 is in accordance with the teachings of the embodiments described throughout this disclosure, such as provided by nodes such as wireless device 50 and network node 30, along with the corresponding methods 500 and 600. The embodiments described herein enable the sending of conditional handover complete message to be optional. To ensure that a handover is executed as fast as possible, the UE is allowed to skip the conditional handover complete message if the triggering condition is met for a candidate target cell before the conditional handover configuration procedure has completed. This provides for faster execution of the handover, which reduces service interruption and decreases the risk of radio link failure in the source cell. The teachings of these embodiments may improve the reliability, quality, latency and/or power consumption for the network and UE 830 using the OTT connection 850.

A measurement procedure may be provided for the purpose of monitoring data rate, latency and other factors on which the one or more embodiments improve. There may further be an optional network functionality for reconfiguring the OTT connection 850 between the host computer 810 and UE 830, in response to variations in the measurement results. The measurement procedure and/or the network functionality for reconfiguring the OTT connection 850 may be implemented in the software 811 of the host computer 810 or in the software 831 of the UE 830, or both. In embodiments, sensors (not shown) may be deployed in or in association with communication devices through which the OTT connection 850 passes; the sensors may participate in the measurement procedure by supplying values of the monitored quantities exemplified above, or supplying values of other physical quantities from which software 811, 831 may compute or estimate the monitored quantities. The reconfiguring of the OTT connection 850 may include message format, retransmission settings, preferred routing etc.; the reconfiguring need not affect the base station 820, and it may be unknown or imperceptible to the base station 820. Such procedures and functionalities may be known and practiced in the art. In certain embodiments, measurements may involve proprietary UE signaling facilitating the host computer's 810 measurements of throughput, propagation times, latency and the like. The measurements may be implemented in that the software 811, 831 causes messages to be transmitted, in particular empty or 'dummy' messages, using the OTT connection 850 while it monitors propagation times, errors etc.

Figures 9, 10:
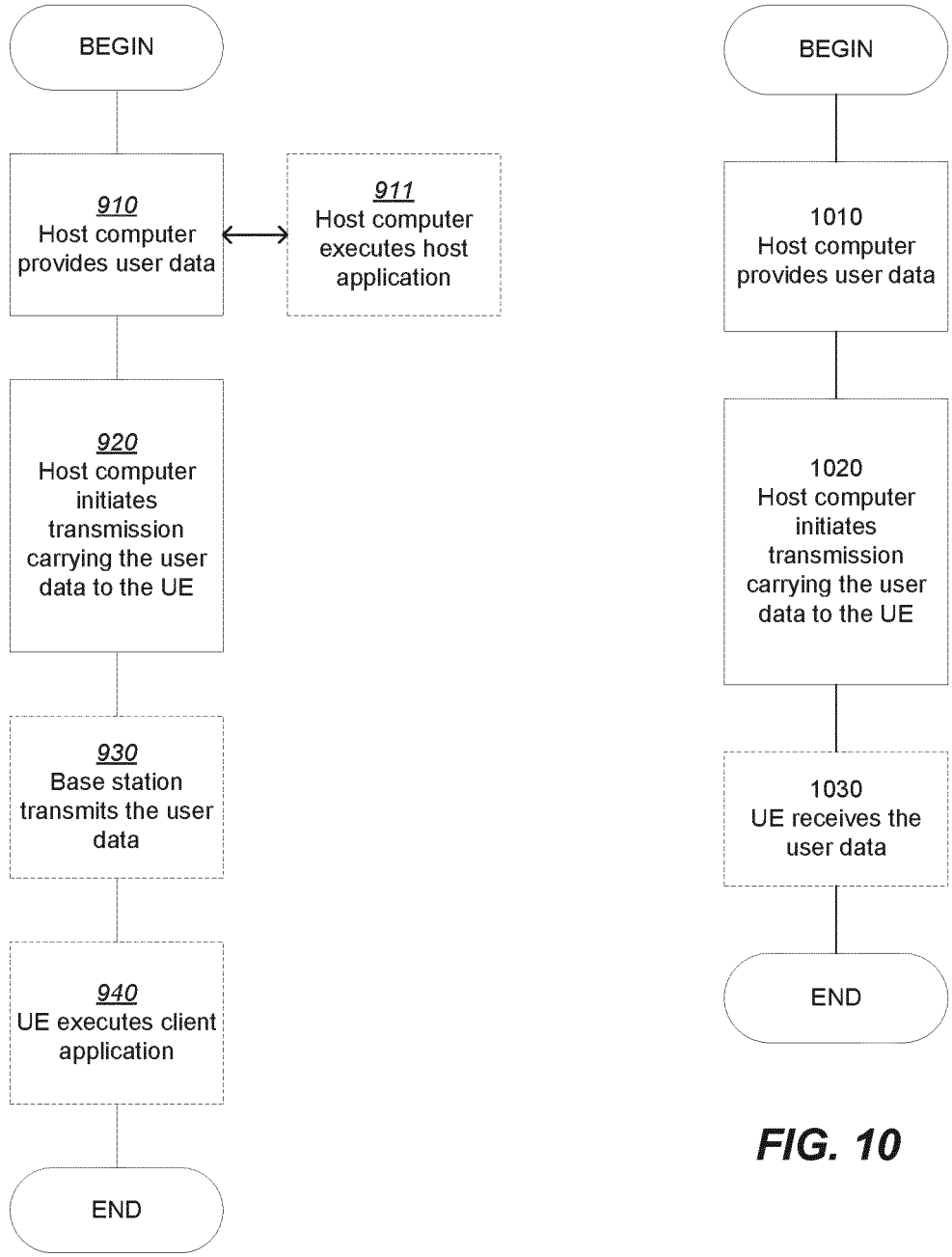
FIGS. 9 to 12 are flowcharts illustrating exemplary methods implemented in a communication system including a host computer, a base station and a user equipment.

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In a first step 910 of the method, the host computer provides user data. In an optional substep 911 of the first step 910, the host computer provides the user data by executing a host application. In a second step 920, the host computer initiates a transmission carrying the user data to the UE. In an optional third step 930, the base station transmits to the UE the user data which was carried in the transmission that the host computer initiated, in accordance with the teachings of the embodiments described throughout this disclosure. In an optional fourth step 940, the UE executes a client application associated with the host application executed by the host computer.

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In a first step 1010 of the method, the host computer provides user data. In an optional substep (not shown) the host computer provides the user data by executing a host application. In a second step 1020, the host computer initiates a transmission carrying the user data to the UE. The transmission may pass via the base station, in accordance with the teachings of the embodiments described throughout this disclosure. In an optional third step 1030, the UE receives the user data carried in the transmission.

Figure 11:
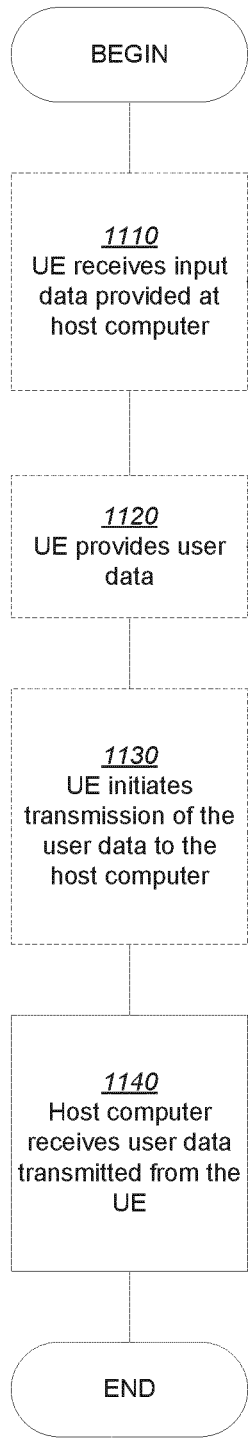

FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section. In an optional first step 1110 of the method, the UE receives input data provided by the host computer. Additionally, or alternatively, in an optional second step 1120, the UE provides user data. In an optional substep 1121 of the second step 1120, the UE provides the user data by executing a client application. In a further optional substep 1111 of the first step 1110, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1130, transmission of the user data to the host computer. In a fourth step 1140 of the method, the host computer receives the user data transmitted from the UE, in accordance with the teachings of the embodiments described throughout this disclosure.

Figure 12:
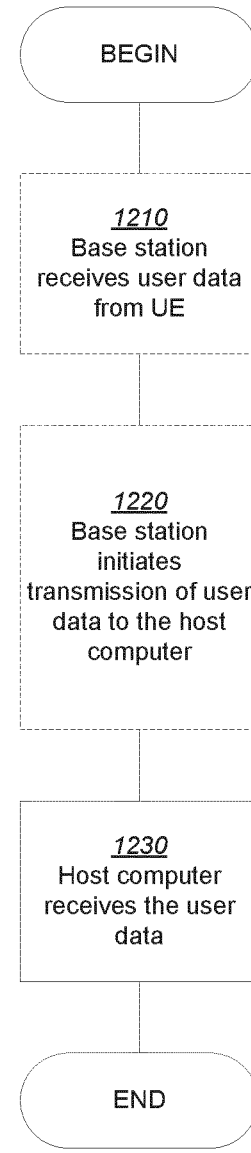

FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section. In an optional first step 1210 of the method, in accordance with the teachings of the embodiments described throughout this disclosure, the base station receives user data from the UE. In an optional second step 1220, the base station initiates transmission of the received user data to the host computer. In a third step 1230, the host computer receives the user data carried in the transmission initiated by the base station.

As discussed in detail above, the techniques described herein, e.g., as illustrated in the process flow diagrams of FIGS. 5 and 6, may be implemented, in whole or in part, using computer program instructions executed by one or more processors. It will be appreciated that a functional implementation of these techniques may be represented in terms of functional modules, where each functional module corresponds to a functional unit of software executing in an appropriate processor or to a functional digital hardware circuit, or some combination of both.

Figure 13:
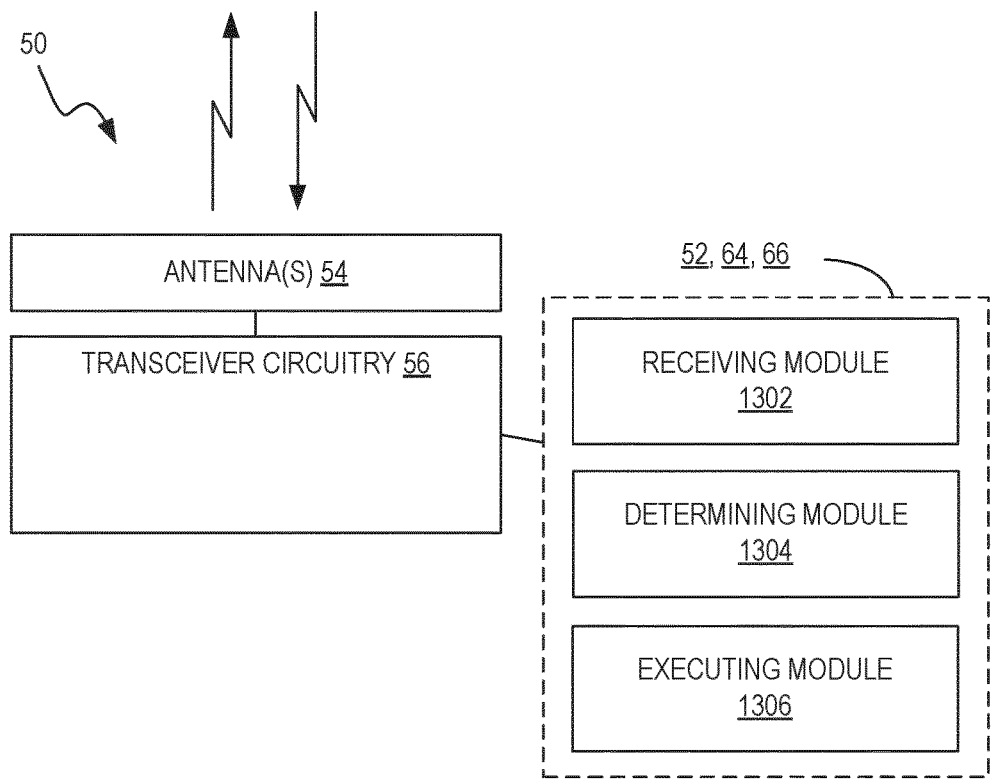
FIG. 13 is a block diagram illustrating a functional implementation of a wireless device, according to some embodiments.

FIG. 13 illustrates an example functional module or circuit architecture for wireless device 50 that includes a receiving module 1302 for receiving, from a source node, a conditional handover command, the conditional handover command including or being associated with a triggering condition for execution of handover to a target cell or target beam. The implementation also includes a determining module 1304 for, prior to sending a message confirming completion of conditional handover configuration triggered by receipt of the conditional handover command, determining that handover has been triggered. The implementation also includes an executing module 1306 for, responsive to the determining, executing handover without sending the message confirming completion of conditional handover configuration.

Figure 14:
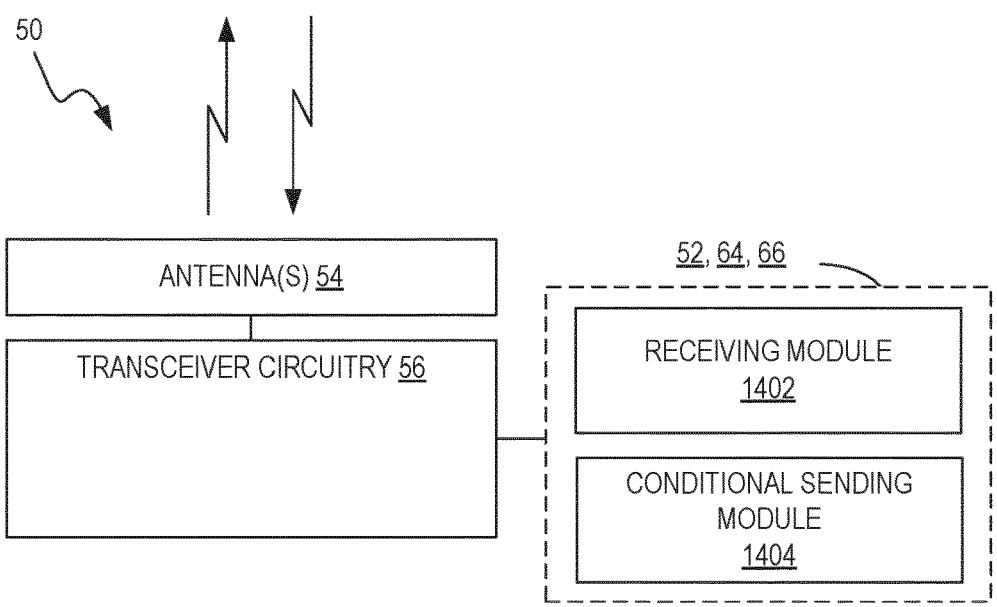
FIG. 14 is a block diagram illustrating another functional implementation of a wireless device, according to some embodiments.

FIG. 14 illustrates another example functional module or circuit architecture for wireless device 50 that includes a receiving module 1402 for receiving, from a source node, a conditional handover command, the conditional handover command including or being associated with a triggering condition for execution of handover to a target cell or target beam. The implementation also includes a conditional sending module 1404 for conditionally sending a message confirming completion of conditional handover configuration in response to the conditional handover command, where conditionally sending the message comprises (a) sending the message if no handover is triggered prior to a time for sending the message; and (b) refraining from sending the message and executing handover if handover is triggered prior to the time for sending the message.

In the following, further enumerated exemplary embodiments are described:

A1. A communication system including a host computer comprising:
   processing circuitry configured to provide user data; and
   a communication interface configured to forward the user data to a cellular network for transmission to a user equipment (UE), wherein the cellular network comprises a base station having a radio interface and processing circuitry, the base station's processing circuitry configured to perform any of the operations comprising embodiments A1-A12.

A2. The communication system of the previous embodiment further including the base station.

A3. The communication system of the previous two embodiments, further including the UE, wherein the UE is configured to communicate with the base station.

A4. The communication system of the previous three embodiments, wherein:
   the processing circuitry of the host computer is configured to execute a host application, thereby providing the user data; and
   the UE comprises processing circuitry configured to execute a client application associated with the host application.

A5. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the base station performs any of the steps of any of embodiments A1-A12.

A6. The method of the previous embodiment, further comprising, at the base station, transmitting the user data.

A7. The method of the previous 2 embodiments, wherein the user data is provided at the host computer by executing a host application, the method further comprising, at the UE, executing a client application associated with the host application.

A8. A user equipment (UE) configured to communicate with a base station, the UE comprising a radio interface and processing circuitry configured to perform any of the previous 3 embodiments.

A9. A communication system including a host computer comprising:
   processing circuitry configured to provide user data; and
   a communication interface configured to forward user data to a cellular network for transmission to a user equipment (UE),
   wherein the UE comprises a radio interface and processing circuitry, the UE's components configured to perform any of the steps of any of previous embodiments.

A10. The communication system of the previous embodiment, wherein the cellular network further includes a base station configured to communicate with the UE.

A11. The communication system of the previous 2 embodiments, wherein:
   the processing circuitry of the host computer is configured to execute a host application, thereby providing the user data; and
   the UE's processing circuitry is configured to execute a client application associated with the host application.

A12. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the UE performs any of the steps of any of previous embodiments.

A13. The method of the previous embodiment, further comprising at the UE, receiving the user data from the base station.

A14. A communication system including a host computer comprising:
   communication interface configured to receive user data originating from a transmission from a user equipment (UE) to a base station,
   wherein the UE comprises a radio interface and processing circuitry, the UE's processing circuitry configured to perform any of the steps of any of previous embodiments.

A15. The communication system of the previous embodiment, further including the UE.

A16. The communication system of the previous 2 embodiments, further including the base station, wherein the base station comprises a radio interface configured to communicate with the UE and a communication interface configured to forward to the host computer the user data carried by a transmission from the UE to the base station.

A17. The communication system of the previous 3 embodiments, wherein:
   the processing circuitry of the host computer is configured to execute a host application; and
   the UE's processing circuitry is configured to execute a client application associated with the host application, thereby providing the user data.

A18. The communication system of the previous 4 embodiments, wherein:
   the processing circuitry of the host computer is configured to execute a host application, thereby providing request data; and
   the UE's processing circuitry is configured to execute a client application associated with the host application, thereby providing the user data in response to the request data.

A19. A method implemented in a communication system including a host computer, a base station and a user equipment (UE), the method comprising:
at the host computer, receiving user data transmitted to the base station from the UE, wherein the UE performs any of the steps of any of previous embodiments.

A20. The method of the previous embodiment, further comprising, at the UE, providing the user data to the base station.

A21. The method of the previous 2 embodiments, further comprising:
at the UE, executing a client application, thereby providing the user data to be transmitted; and
at the host computer, executing a host application associated with the client application.

A22. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

A23. A communication system including a host computer comprising a communication interface configured to receive user data originating from a transmission from a User equipment (UE) to a base station, the base station comprising a radio interface and processing circuitry configured to communicate with the base station and cooperatively perform operations of any of previous embodiments.

A24. The communication system of the previous embodiment further including the base station.

A25. The communication system of the previous two embodiments, further including the UE, wherein the UE is configured to communicate with the base station.

A26. The communication system of the previous three embodiments, wherein:
the processing circuitry of the host computer is configured to execute a host application; and
the UE is further configured to execute a client application associated with the host application, thereby providing the user data to be received by the host computer.

A27. A method implemented in a communication system including a host computer, a base station and a user equipment (UE), the method comprising:
at the host computer, receiving, from the base station, user data originating from a transmission which the base station has received from the UE, wherein the UE performs any of the steps of any of previous embodiments.

A28. The method of the previous embodiment, further comprising at the base station, receiving the user data from the UE.

A29. The method of the previous 2 embodiments, further comprising at the base station, initiating a transmission of the received user data to the host computer.

B1. A method, in a wireless device operating in a wireless communication network, the method comprising:
receiving, from a source node, a conditional handover command, the conditional handover command including or being associated with a triggering condition for execution of handover to a target cell or target beam;
prior to sending a message confirming completion of conditional handover configuration triggered by receipt of the conditional handover command, determining that handover has been triggered; and
responsive to said determining, executing handover without sending the message confirming completion of conditional handover configuration.

B2. The method of example embodiment B 1, wherein determining that handover has been triggered comprises determining that the triggering condition received in the conditional handover command has been met, and wherein executing handover comprises executing handover towards the target cell or target beam.

B3. The method of example embodiment B 1, wherein determining that handover has been triggered comprises determining that a triggering condition received in a previously received conditional handover command has been met, and wherein executing handover comprises executing handover towards a target cell or target beam corresponding to the previously received conditional handover command.

B4. The method of any of example embodiments B1-B3, wherein determining that handover has been triggered occurs prior to sending a hybrid automatic repeat request (HARQ) acknowledgement in response to the conditional handover command, and wherein the method further comprises executing the handover without sending the HARQ acknowledgment in response to the conditional handover command.

B5. The method of any of example embodiments B1-B4, wherein said executing handover without sending the message confirming completion of conditional handover configuration is conditioned upon determining that the conditional handover message includes an indication that skipping the message confirming completion of conditional handover condition is allowed.

B6. The method of any of example embodiments B1-B5, wherein executing handover comprises performing random access towards the wireless communications network and sending a handover complete message towards the wireless communications network after completing the random access.

B7. A method, in a wireless device operating in a wireless communication network, the method comprising:
receiving, from a source node, a conditional handover command, the conditional handover command including or being associated with a triggering condition for execution of handover to a target cell or target beam;
conditionally sending a message confirming completion of conditional handover configuration in response to the conditional handover command, wherein conditionally sending the message comprises (a) sending the message if no handover is triggered prior to a time for sending the message; and (b) refraining from sending the message and executing handover if handover is triggered prior to the time for sending the message.

B8. The method of example embodiment B7, wherein handover is triggered, prior to the time for sending the message, by fulfillment of the triggering condition received in the conditional handover command, and wherein executing handover comprises executing handover towards the target cell or target beam.

B9. The method of example embodiment B7, wherein handover is triggered, prior to the time for sending the message, by fulfillment of a triggering condition received in a previously received conditional handover command, and wherein executing handover comprises executing handover towards a target cell or target beam corresponding to the previously received conditional handover command.

B10. The method of any of example embodiments B7-B9, wherein handover is triggered prior to sending a hybrid automatic repeat request (HARQ) acknowledgement in response to the conditional handover command, and wherein the method further comprises executing the handover without sending the HARQ acknowledgment in response to the conditional handover command.

B11. The method of any of example embodiments B7-B10, wherein handover is triggered, prior to the time for sending the message, and wherein refraining from sending the message confirming completion of conditional handover configuration is conditioned upon determining that the conditional handover message includes an indication that skipping the message confirming completion of conditional handover condition is allowed.

B12. The method of any of example embodiments B7-B11, wherein executing handover comprises performing random access towards the wireless communications network and sending a handover complete message towards the wireless communications network after completing the random access.

B13. A wireless device adapted to perform the methods of any of example embodiments B1-B12.

The invention claimed is:

1. A method, in a wireless device operating in a wireless communication network, the method comprising:
   receiving, from a source node, a conditional handover command, the conditional handover command including or being associated with a triggering condition for execution of handover to a target cell or target beam;
   conditionally sending a message confirming completion of conditional handover configuration in response to the conditional handover command, wherein conditionally sending the message comprises (a) sending the message if no handover is triggered prior to a time for sending the message; and (b) refraining from sending the message and executing handover if handover is triggered prior to the time for sending the message.

2. The method of claim 1, wherein handover is triggered, prior to the time for sending the message, by fulfillment of the triggering condition received in the conditional handover command, and wherein executing handover comprises executing handover towards the target cell or target beam.

3. The method of claim 1, wherein handover is triggered, prior to the time for sending the message, by fulfillment of a triggering condition received in a previously received conditional handover command, and wherein executing handover comprises executing handover towards a target cell or target beam corresponding to the previously received conditional handover command.

4. The method of claim 1, wherein handover is triggered prior to sending a hybrid automatic repeat request (HARQ) acknowledgement in response to the conditional handover command, and wherein the method further comprises executing the handover without sending the HARQ acknowledgment in response to the conditional handover command.

5. The method of claim 1, wherein handover is triggered, prior to the time for sending the message, and wherein refraining from sending the message confirming completion of conditional handover configuration is conditioned upon determining that the conditional handover message includes an indication that skipping the message confirming completion of conditional handover condition is allowed.

6. The method of claim 1, wherein executing handover comprises performing random access towards the wireless communications network and sending a handover complete message towards the wireless communications network after completing the random access.

7. The method of claim 1, wherein after receiving the conditional handover command, the wireless device adds the target cell or target beam to a list of candidate cells or candidate beams and starts monitoring the triggering condition received together with the conditional handover command.

8. The method of claim 1, wherein the source node is a first evolved radio access node (eNB) wherein the target cell or target beam is provided by a second eNB, wherein the conditional handover command is a RRC Connection Reconfiguration Message including Mobility Control Information, and the message confirming completion of the conditional handover configuration is a RRC Connection Reconfiguration Complete message according to 3GPP Long Term Evolution (LTE) specifications.

9. The method of claim 1, wherein the source node is a first New Radio (NR) radio access node (gNB) wherein the target cell or target beam is provided by a second gNB, wherein the conditional handover command is a RRC Reconfiguration Message including reconfiguration with Sync, and the message confirming completion of the conditional handover configuration is a RRC Reconfiguration Complete message according to 3GPP New Radio (NR) specifications.

10. A wireless device comprising transceiver circuitry and processing circuitry operatively associated with the transceiver circuitry and configured to perform the steps of:
    receiving, from a source node, a conditional handover command, the conditional handover command including or being associated with a triggering condition for execution of handover to a target cell or target beam;
    conditionally sending a message confirming completion of conditional handover configuration in response to the conditional handover command, wherein conditionally sending the message comprises (a) sending the message if no handover is triggered prior to a time for sending the message; and (b) refraining from sending the message and executing handover if handover is triggered prior to the time for sending the message.

11. The wireless device of claim 10, wherein handover is triggered, prior to the time for sending the message, by fulfillment of the triggering condition received in the conditional handover command, and wherein the processing circuitry is configured to execute handover by executing handover towards the target cell or target beam.

12. The wireless device of claim 10, wherein handover is triggered, prior to the time for sending the message, by fulfillment of a triggering condition received in a previously received conditional handover command, and wherein the processing circuitry is configured to handover by executing handover towards a target cell or target beam corresponding to the previously received conditional handover command.

13. The wireless device of claim 10, wherein handover is triggered prior to sending a hybrid automatic repeat request (HARQ) acknowledgement in response to the conditional handover command, and wherein the processing circuitry is configured to execute the handover without sending the HARQ acknowledgment in response to the conditional handover command.

14. The wireless device of claim 10, wherein handover is triggered, prior to the time for sending the message, and wherein the processing circuitry is configured to condition refraining from sending the message confirming completion of conditional handover configuration upon determining that the conditional handover message includes an indication that skipping the message confirming completion of conditional handover condition is allowed.

15. The wireless device of claim 10, wherein the processing circuitry is configured to execute handover by performing random access towards the wireless communications network and sending a handover complete message towards the wireless communications network after completing the random access.

16. The wireless device of claim 10, wherein the processing circuitry is configured to, after receiving the conditional handover command, add the target cell or target beam to a list of candidate cells or candidate beams and start monitoring the triggering condition received together with the conditional handover command.

17. The wireless device of claim 10, wherein the source node is a first evolved radio access node (eNB), wherein the target cell or target beam is provided by a second eNB, wherein the conditional handover command is a RRC Connection Reconfiguration Message including Mobility Control Information, and wherein the message confirming completion of the conditional handover configuration is a RRC Connection Reconfiguration Complete message according to 3GPP Long Term Evolution (LTE) specifications.

18. The wireless device of claim 10, wherein the source node is a first New Radio (NR) radio access node (gNB), wherein the target cell or target beam is provided by a second gNB, wherein the conditional handover command is a RRC Reconfiguration Message including reconfiguration with Sync, and wherein the message confirming completion of the conditional handover configuration is a RRC Reconfiguration Complete message according to 3GPP New Radio (NR) specifications.

19. A non-transitory computer-readable medium comprising, stored thereupon, computer program instructions for execution by a processing circuit of a wireless device, the program instructions being configured to cause the wireless device to, under the control of the processing circuit:
receive, from a source node, a conditional handover command, the conditional handover command including or being associated with a triggering condition for execution of handover to a target cell or target beam;
conditionally send a message confirming completion of conditional handover configuration in response to the conditional handover command, wherein conditionally sending the message comprises (a) sending the message if no handover is triggered prior to a time for sending the message; and (b) refraining from sending the message and executing handover if handover is triggered prior to the time for sending the message.

* * * * *

UNITED STATES PATENT AND TRADEMARK OFFICE
CERTIFICATE OF CORRECTION

PATENT NO. : 12,041,497 B2  
APPLICATION NO. : 17/598604  
DATED : July 16, 2024  
INVENTOR(S) : Ohlsson et al.

Page 1 of 1

It is certified that error appears in the above-identified patent and that said Letters Patent is hereby corrected as shown below:

On the Title Page

In Item (56), under "OTHER PUBLICATIONS", in Column 2, Line 4, delete "11-474." and insert -- 1-474. --, therefor.

In the Specification

In Column 4, Line 62, delete "node↔access and mobility function" and insert -- node↔access and mobility management function --, therefor.

In Column 7, Line 15, delete "multi-standard" and insert -- multi-standard radio --, therefor.

In Column 8, Line 33, delete "equipped" and insert -- equipment --, therefor.

In Column 12, Line 60, delete "use" and insert -- user --, therefor.

Signed and Sealed this  
First Day of April, 2025

Coke Morgan Stewart  
*Acting Director of the United States Patent and Trademark Office*